(12) United States Patent
Goulding

(10) Patent No.: X4860
(45) Date of Patent: Aug. 24, 1827

(54) LOOM SHUTTLES, MODE OF THROWING

(76) Inventor: John Goulding

John Goulding
Letters Patent, Dated August 24. 1827.

---

The Schedule referred to in these Letters Patent and making part of the same, containing a description in the words of the said John Goulding himself of his improvement in the mode of throwing the shuttle or shuttles in weaving

---

To all Persons to whom these Presents shall come, John Goulding of Dedham in the County of Norfolk and Commonwealth of Massachusetts machinist Sends Greeting.

Figure 1:
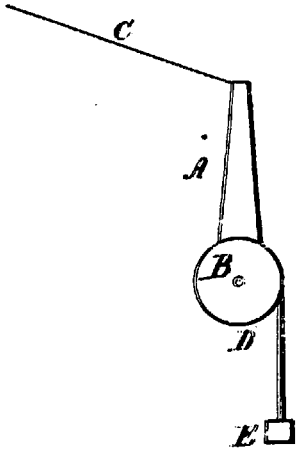
Figure 1:
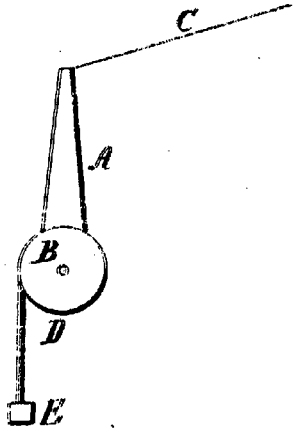

Be it known that I the said John Goulding have invented, constructed and applied to use a new and useful improvement in the mode of throwing the shuttle or shuttles in weaving; and the nature of the said invention and the manner in which the same is to be performed, are particularly described and ascertained in and by the drawings hereunto annexed and the following description thereof — that is to say, the representation of Fig 1 Letters A. A. are the flys or levers hinged as to turn freely on their centers at B.B. from the top of these levers are attached straps or picker strings C.C. the other end of said straps or picker strings is attached to blocks or pickers, which serve to drive the shuttle. D is a strap that leads from a pulley attached to the bottom end of these levers to the treadle E.E. these treadles receive their motion from a horizontal shaft by a lever as is customary. These flys can take their motion from a shaft that goes round twice to the lay or batten going back and forward, as the shuttle passes out of the left hand box into the right it carries the right hand picker into the box [illegible] thrown into the right hand treadle
so that when the cam of the right hand comes round
again it discharges the shuttle out of the right hand
box into the left hand box; if two or more shuttles are
wanted to be used and different coloured wefts, so as
that two or more shuttles may be thrown either from
right to left or
left to right, then two fly treadles must be attached to
each other by a cross bar: this cross bar must have
a backward and forward side motion so that when
the crossbar moves to the right the right hand cam
operates on the right hand treadle; it will throw
the shuttle from the right to the left and as it moves
to the left then the left hand cam strikes the treadle
again and throws it to the right; in this case
there is but one cam that comes in contact with
a treadle at one time, and this gives an opportuni-
ty to throw as many shuttles from one side in
succession as may be wanted -
The side motion to the connecting bar may be
given by a cam or any other method the engineer
may think proper; there being two flys, gives a
chance to drive the shuttle by the same shaft
that operates the lay or beater, provided the lay
is operated by a crank or single eccentric frame.
If more than one shuttle is used the picker on the
shuttle rod, must be carried back after throwing
the shuttle across by a cam, spring or weight
attached to it to give a chance for the shuttle box
to shift and bring another shuttle to throw
across in succession. -
What I claim as new and as my improvement
and invention is the application of a cam to
throw a second Fly or Lever so that each shuttle

[illegible] be [illegible] upon [illegible] [illegible] [illegible] manner [illegible] [illegible] [illegible] [illegible] [illegible] [illegible] them [illegible] [illegible] in [illegible] [illegible] [illegible] [illegible] [illegible] [illegible] [illegible] in [illegible].

In testimony that the above is a true specification, of my said improvement as above described and for which I herein claim Letters Patent, I have hereto set my hand and seal the sixteenth day of August in the Year of our Lord, one thousand eight hundred and twenty seven.

[illegible] [illegible]
[illegible] Richardson
Wm Ellis

John [illegible]

( [illegible] and [illegible] [illegible] Feb 7 14/1844)

[illegible] [illegible]

J. Goulding.

Shuttle Motion.

Patented Aug. 24, 1827.